UNITED STATES PATENT OFFICE.

PHILIP L. SYLVESTER, OF AUBURN, NEW YORK, ASSIGNOR TO WOODRUFF BROTHERS, OF SAME PLACE.

MANUFACTURE OF BUTTONS FROM PLASTIC MATERIAL.

SPECIFICATION forming part of Letters Patent No. 229,490, dated June 29, 1880.

Application filed May 8, 1880. (No specimens.)

*To all whom it may concern:*

Be it known that I, PHILIP L. SYLVESTER, of Auburn, in the county of Cayuga, and in the State of New York, have invented certain new and useful Improvements in the Manufacture of Buttons from Plastic Material, (Case B;) and I do hereby declare that the following is a full, clear, and exact description thereof.

In the manufacture of buttons from plastic material it has heretofore been customary to prepare the material in squares having each a sufficient size only to cover one of the button-dies, by which means so much time was required in the placing of said material in position as to render impracticable the employment of many dies in one plate, the result being that but a small number of buttons could be produced at one operation of the press. To remedy this difficulty is the design of my invention, which consists in an improved method of employing the plastic material, substantially as and for the purpose hereinafter specified.

In the manufacture of buttons I prepare the plastic material in sheets which have substantially the shape and dimensions of the plate of dies employed, each of which sheets is then laid upon a heated plate, and when sufficiently softened is cut into strips that have each sufficient width to cover one of the dies, and such length as to enable it to extend over an entire row of such dies, which strips are placed in position as easily and quickly as would be an equal number of pieces having each a sufficient size to cause it to cover a single die. The dies thus covered with strips of plastic material are then covered with the opposite dies and subjected to pressure in the usual manner.

By means of my improvement one operator can in a given time and with the same labor produce several times the number of buttons that has heretofore been possible.

Having thus fully set forth the nature and merits of my invention, what I claim as new is—

An improved method of employing plastic material in the manufacture of buttons by cutting said material into plain sheets, softening said sheets upon a heated plate, and then cutting the same into strips, and placing each of said strips upon or over a row of dies, substantially as and for the purpose specified.

In testimony that I claim the foregoing I have hereunto set my hand this 5th of May, 1880.

P. L. SYLVESTER.

Witnesses:
P. C. WOODRUFF,
H. WOODRUFF.